Figure 1:
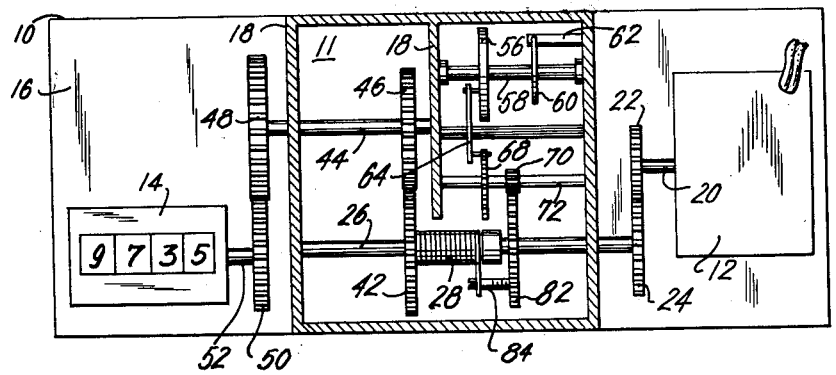

March 24, 1964   O. W. DILLON ETAL   3,125,890
DRIVE MECHANISM
Filed Oct. 2, 1961

INVENTORS
OSCAR W. DILLON
ROBERT J. SPOONER
BY
Curtis, Morris & Safford
ATTORNEYS United States Patent Office 3,125,890
Patented Mar. 24, 1964

3,125,890
DRIVE MECHANISM
Oscar W. Dillon and Robert J. Spooner, Old Saybrook, Conn., assignors to Vocaline Company of America, Inc., Old Saybrook, Conn., a corporation of Connecticut
Filed Oct. 2, 1961, Ser. No. 142,274
9 Claims. (Cl. 74—125.5)

This invention relates to a speed-controlled drive mechanism; more particularly, it relates to a device having an output shaft whose speed of rotation is accurately regulated or timed.

An object of this invention is to provide a drive mechanism which will supply an accurately-timed rotary output even though the speed of its input source varies.

Another object of this invention is to provide an accurately-timed rotary drive mechanism which is rugged and simple in construction.

A still further object of this invention is to provide such a mechanism which is relatively cheap to manufacture.

These and other objects will in part be understood from and in part pointed out in the description given hereinafter.

A typical timing mechanism such as a clock uses a balance wheel with an escapement for controlling the drive of clock hands and the like. In such mechanisms the output power available is usually very minute. Moreover, most of such mechanisms require a specialized drive, such as a spring or a step-by-step motor. In many instances, however, it is desirable to have available a much larger drive power and to be able to use a continuously rotating electric motor.

Some timing mechanisms use an electric motor, without a balance wheel or escapement, to drive the clock hands or other load. Their accuracy, however, depends on the constancy with which the speed of the drive motor runs. But since such mechanisms usually require synchronous electrical energy, such as 60 cycle A.C. voltage, they are unusable in places where this is not available. The present invention provides a simple and rugged drive mechanism having an accurately regulated output drive, the mechanism itself being supplied with input power by a small non-synchronous electric motor, for example.

In accordance with the present invention, there is provided a drive mechanism which does not use electrical contacts or solenoids, and whose accuracy is relatively independent of the speed of its drive motor and its output load. A preferred embodiment of this invention uses a spring-grip clutch which is regulated by a balance wheel and an escapement intermittently to couple a continuously-rotating driving motor to an output shaft in order to drive the latter at an accurately timed speed. The use of a spring-grip clutch makes this mechanism inherently more rugged and trouble-free than other previously known timing mechanisms, and has the added advantage that a considerable amount of output drive power can be provided. The drive motor for this mechanism and the spring-grip clutch are very inexpensive; moreover this new drive arrangement is more rugged and reliable than previous ones, while still being accurate and easy to manufacture.

Figure 2:
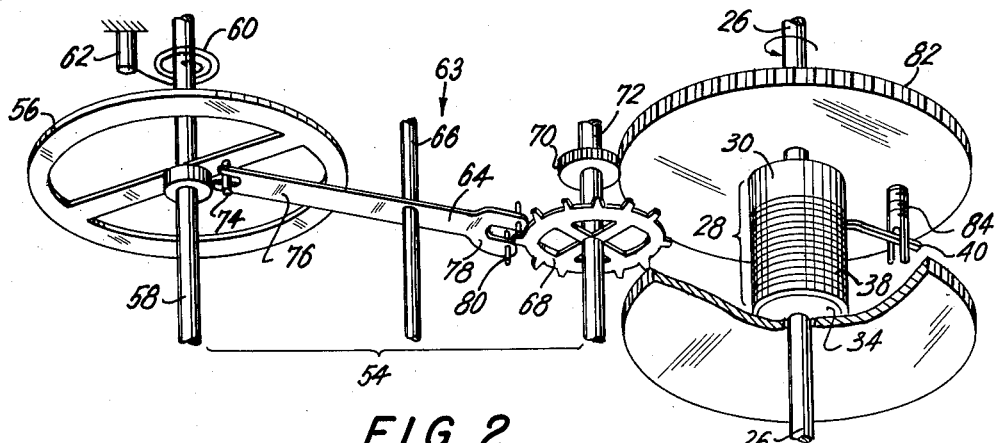
Figure 3:
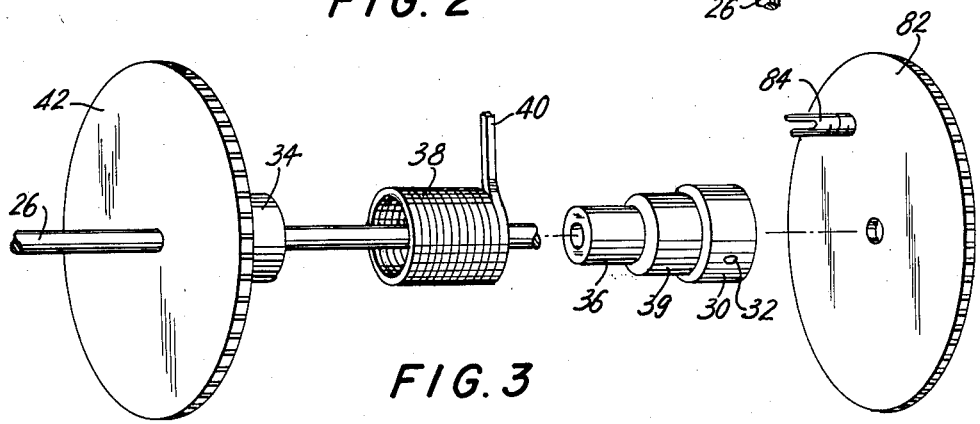

A better understanding of the invention together with a fuller appreciation of its many advantages will best be gained from the following detailed description given in connection with the accompanying drawings wherein:

FIGURE 1 is a plan view of one embodiment of the invention, showing the invention being used to drive time indicating means, FIGURE 2 is an enlarged, partly schematic and partly sectional view of some of the main components of the embodiment shown in FIGURE 1, and FIGURE 3 is an exploded view of the spring-grip clutch shown in FIGURES 1 and 2, displaying its structural features.

The drive arrangement 10 shown in FIGURE 1, includes a timing mechanism 11 connected between an electric drive motor 12 and a time indicator 14, which here is shown as a Veeder-Root type counter. The timing mechanism 11, the electrical motor 12, and the time indicator 14 are all mounted upon a base plate 16. The mechanism 11 is enclosed and supported in a housing 18, which is shown cut away in FIGURE 1 to facilitate viewing of its internal components.

Motor 12 has an output shaft 20 upon which is fitted a spur gear 22. Spur gear 22 meshes with a similar spur gear 24 which is fixed upon the input drive shaft 26 of the timing mechanism 11. Shaft 26 is journaled in the housing 18, so that shaft 26 here rotates in housing 18 at a speed in fixed relation to the speed of the motor 12.

Mounted on shaft 26 is a spring-grip clutch 28. The mounting of the clutch and the details of its components are shown in FIGURES 2 and 3. Referring specifically to FIGURE 3, clutch 28 consists of an input hub 30 secured to shaft 26 by means of a set screw 32, an output hub 34 which is journaled upon a protruding portion 36 of the input hub 30, and a coiled or helical spring 38. The helical spring 38 is dimensioned so that it tends to contact and grip the surface of output hub 34 and a surface 39 of input hub 30 which has a diameter equal to that of the output hub 34. When opposing torques are applied to the input hub 30 and output hub 34, the two hubs will be clutched together if the direction of the torques is such that the spring 38 tends to be contracted more tightly onto the surfaces of the input hub 30 and output hub 34. These hubs will be un-clutched from one another when the torques are in directions such that spring 38 tends to become unwound and expanded in diameter.

One end 40 of the spring 38 is bent radially outward from the spring 38 in order that coiling or uncoiling (and, therefore, clutching or un-clutching) of the spring 38 may be controlled by retarding or releasing end 40. When, as mentioned above, bent end 40 is not retarded, spring 38 automatically contracts and grips hubs 34 and 39, thereby establishing a strong, rugged driving connection between input shaft 26 and the output hub 34. On the other hand, retarding or breaking of spring end 40 causes disengagement of the clutch 28.

Referring also to FIGURES 1 and 2, a spur gear 42 is shown secured to the output hub 34 of spring clutch 28. When electric motor 12 rotates shaft 26, it will supply torque to gear 42 if and only if clutch 28 is engaged.

An output shaft 44 is journaled parallel to input shaft 26 in housing 18. Fixed upon shaft 44 is a spur gear 46 which meshes with spur gear 42. Also fixed upon shaft 44 is a gear 48 which meshes with and drives a similar gear 50 which is affixed to the drive shaft 52 of counter 14. In this arrangement it can easily be seen that when electric motor 12 rotates input shaft 26, counter 14 will be driven forward if and only if spring-grip clutch 28 is engaged.

In order to regulate the rotation of output hub 34, clutch 28 is controlled from a timing standard. To this end there is provided a balance-wheel assembly 54, which is indicated in enlarged detail in FIGURE 2. This assembly consists of the following components: an oscillatable balance wheel 56 carried by a shaft 58 which is journaled in housing 18 and is aligned so as to be parallel with input shaft 26; a spiral hair-spring 60 having its inner end attached to shaft 58 and its outer end attached to a projection 62 which is secured to the housing 18; and an escapement generally indicated at 63. The escapement 63 consists of a pallet lever 64 fitted upon a shaft 66. The latter is also journaled in housing 18 parallel to shaft 26, with a ratchet wheel 68 and an output spur gear 70 coaxially fitted upon a shaft 72 which is also journaled in housing 18 parallel to shaft 26.

Referring primarily to FIGURE 2, the operation of the balance wheel assembly 54 will now be described. When the balance wheel 56 is first rotated about its axis and then released, it will continue to oscillate (as would any simple pendulum) because of hairspring 60. Attached to the balance wheel 56 outwardly from its central axis is a pin 74. Now, pallet lever 64 is arranged so that each tip of the yoke 76 (which forms one end of the pallet lever 64) will engage pin 74 once during each oscillation of the balance wheel. Thus, as the balance wheel oscillates, pallet level 64 moves to and fro in a plane perpendicular to the shaft 56 upon which it rotates. At the other end 78 of pallet lever 64 is a pair of spaced projections 80. As pallet lever 64 swings to and fro on its shaft 66, each of the projections 80 alternately engages with mating teeth of the ratchet wheel 68. Thus the rachet wheel 68 will move forward one tooth for each swing of pallet lever 64. The rotation of rachet wheel 68 controls the rotation of output spur gear 70. As a result, output spur gear 70 is driven at a rate which is proportional to the rate of oscillation of the balance wheel 56.

Output spur gear 70 meshes with a spur gear 82 which is rotatable upon shaft 26. Gear 82 in turn carries a projection 84 which engages spring end 40. Thus, projection 84 retards spring end 40 at a rate proportional to the rate of oscillation of the balance wheel 56. When the shaft 26 is rotating in the direction indicated in FIGURE 2, at a speed somewhat faster than the speed of gear 82, the projection 84 will retard the progress of the bent end 40 of the spring 38 so that it will unwind and cause the clutch to be disengaged for a moment. When, however, gear 70 advances the distance of one tooth due to a half-cycle of oscillation of balance wheel 56, gear 82 advances. When gear 82 advances a sufficient amount to free the bent end 40 of the spring 38, clutch 28 engages and drives output gear 42 forward a proportional amount. This clutching and un-clutching is repeated during oscillation of the balance wheel 56 so that counter 14 is driven at a speed which is accurately proportional to the rate of oscillation of the balance wheel 56.

As is known, the oscillations of balance wheel 56 will not continue unless periodic drive impulses are supplied to it. Now, these impulses must be of reasonably uniform magnitude or the period of the balance wheel oscillations will vary. But the beauty of the present arrangement is that the drag or retarding force exerted by spring end 40 on gear 82 (and in turn on escapement 63) is effectively constant. Thus this relatively constant force is transmitted to the balance wheel to give it a relatively constant impulse in a direction tending to maintain its oscillations at a constant rate.

The overall operation of drive arrangement 10 is in summary, as follows. At an instant pin 74 of the balance wheel strikes one tip of yoke 76, spring-grip clutch 28 is applying a relatively constant frictional force to projection 84 of gear 82 in the direction of rotation of the shaft 26. This force is transmitted to pin 74 which in turn provides an impulse to the balance wheel 56 whereby sustaining its oscillations. When the pallet lever 64 has rotated far enough, it permits the rachet wheel 68 to rotate one tooth, and gear 82 rotates in unison a proportional distance in the direction of rotation of shaft 26. This motion allows bent end 40 of spring 38 to advance and causes the clutch 28 to engage. But spring end 40 will shortly again be stopped and clutch 28 disengaged, and so on. This clutching and un-clutching is continually controlled by the oscillations of the balance wheel 56, so that the average speed of output hub 34 and shaft 44 is maintained accurately.

It will be appreciated by those skilled in the art that the mechanism described above can be driven by any drive source having a rotating shaft and having suitable size and speed. Either alternating or direct current electrical motors are deemed particularly suitable.

It will be further appreciated that, in accordance with the invention disclosed herein, other sources of timed pulses may be used to selectively engage and disengage a spring-grip clutch so as to produce a timed rotary drive mechanism.

As many embodiments may be made of the above invention and as changes may be made in the embodiment set forth above without departing from the scope of the invention, it is to be understood that all matter hereinbefore set forth or shown in the accompanying drawing is to be interpreted as illustrative only and not in a limiting sense.

We claim:

1. A timing mechanism comprising a spring-grip clutch which includes an input hub, an output hub, and a coiled spring adaptable for selectively drivably interconnecting said input and output hubs; continuously-rotatable input drive means drivably connected to said input hub; and oscillatable timing member; and means for connecting said spring of said spring-grip clutch to said timing member whereby the oscillations of said timing member control the selective interconnection of said input ond output hubs and said spring periodically imparts impulses to said timing member in order to maintain its oscillations at a constant rate.

2. The mechanism as in claim 1 wherein the oscillatable timing member is a balance wheel.

3. An escapement-timed drive mechanism comprising a spring-grip clutch, which includes an input hub, an output hub, and a coiled spring adaptable for selectively drivably interconnecting said input and output hubs; continuously-rotatable input drive means drivably connected to said input hub; a balance wheel; an escapement connected to said balance wheel; and means for connecting said spring of said spring-grip clutch to said escapement whereby impulses are periodically transmitted from said spring through said escapement to said balance wheel in order to maintain the oscillations of said balance wheel at a constant rate, and whereby the oscillations of said balance wheel control the selective interconnection of said input and output hubs.

4. An escapement-timed drive mechanism comprising a continuously-rotatable input drive motor; an input shaft driven by said motor; a spring-grip clutch mounted on said shaft and including an input hub attached to said shaft, an output hub rotatably mounted on said shaft, a coiled spring wrapped around both of said hubs so as to grip them both and thereby drivably interconnect them, one end of said spring being bent outwardly so as to be engageable for expanding said spring and for thereby disconnecting said hubs from one another; a balance wheel assembly, including a balance wheel attached to a spiral hairspring, and an escapement, said escapement culminating in an output spur gear whose motion is regulated by said balance wheel; a control spur gear rotatably mounted on said input shaft so as to engage said output spur gear of said escapement, said control gear having a projection engageable with said bent end of said spring so that said bent end is restrained from rotating with said input shaft and is allowed to rotate only in accordance with the timed motion of said control gear, whereby said spring alternately expands and contracts and thereby alternately connects and disconnects said input and output hubs from one another so that said output hub is driven at a speed proportional to the rate of oscillation of said balance wheel, and whereby the relatively constant force created by the friction between said input hub and said spring when said spring is in its expanded position is transmitted from said bent end of said spring to said projection on said control gear and thence to said escapement which transmits this force to said balance wheel at intervals timed by said balance wheel in order to maintain its oscillations at a constant rate.

5. The mechanism as in claim 4 in which time indicating means is drivably connected to said output hub of said spring clutch.

6. A timing mechanism comprising an oscillatable timing member; timed drive means having an output member which is rotated at a speed proportional to the rate of oscillation of said timing member, said timed drive means comprising a spring grip clutch drivably connected to a continuously-rotating drive motor by means of an input shaft and including an input hub attached to said shaft, an output hub rotatably mounted on said shaft, a spring coiled about said input and output hubs so as to normally grip them both and drivably interconnect them, one end of said spring being engageable for expanding said spring and thereby disconnecting said hubs from one another while said one end of said spring is being supplied with a relatively constant force in the direction of rotation of said shaft due to the friction between said rotating input hub and said spring; means for periodically connecting said one end of said spring to said timing member while said spring is expanded and thereby imparting impulses to said timing member at periodic intervals in order to maintain its oscillations at a consant rate.

7. A timing mechanism comprising rotary input drive means; output means; a spring-grip clutch engageable for drivably interconnecting said input drive means and said output means; an oscillatable timing member; and control means associated with said clutch and said timing member for causing said clutch to engage intermittently at a rate proportional to the rate of oscillation of said timing member, and for deriving impulses from said clutch and transmitting them to said timing member, said impulses tending to maintain the oscillations of said timing member at a constant rate.

8. A timing mechanism comprising rotating input drive means; output means; friction clutch means engageable for drivably interconnecting said input drive means and said output means, said friction clutch means being in relatively light frictional engagement with said input drive means and said output means when said clutch means is in its disengaged condition; an oscillatable timing member; and means for interconnecting said clutch means and said timing member so as to cause intermittent engagement of said clutch means and for periodically supplying said timing member with impulses tending to maintain its oscillations at a constant rate, whereby said output means is driven at a speed proportional to the rate of oscillation of said timing member.

9. A timing mechanism comprising rotary input drive means; output means; a spring-grip clutch engageable for drivably interconnecting said input drive means and said output means; an oscillatable timing member; and means for interconnecting said clutch and said timing member so as to cause intermittent engagement of said clutch and cause said drive means to drive said output means at a speed proportional to the rate of oscillation of said timing member.

References Cited in the file of this patent
UNITED STATES PATENTS

| | | |
|---|---|---|
| 2,355,686 | Swift | Aug. 15, 1944 |
| 2,939,329 | Doerries | June 7, 1960 |
| 2,981,054 | Marti et al. | Apr. 25, 1961 |